Jan. 8, 1963   E. S. GOODRIDGE   3,072,770
METHOD FOR THE FORMATION OF CYLINDERS
Filed March 3, 1958   2 Sheets-Sheet 2
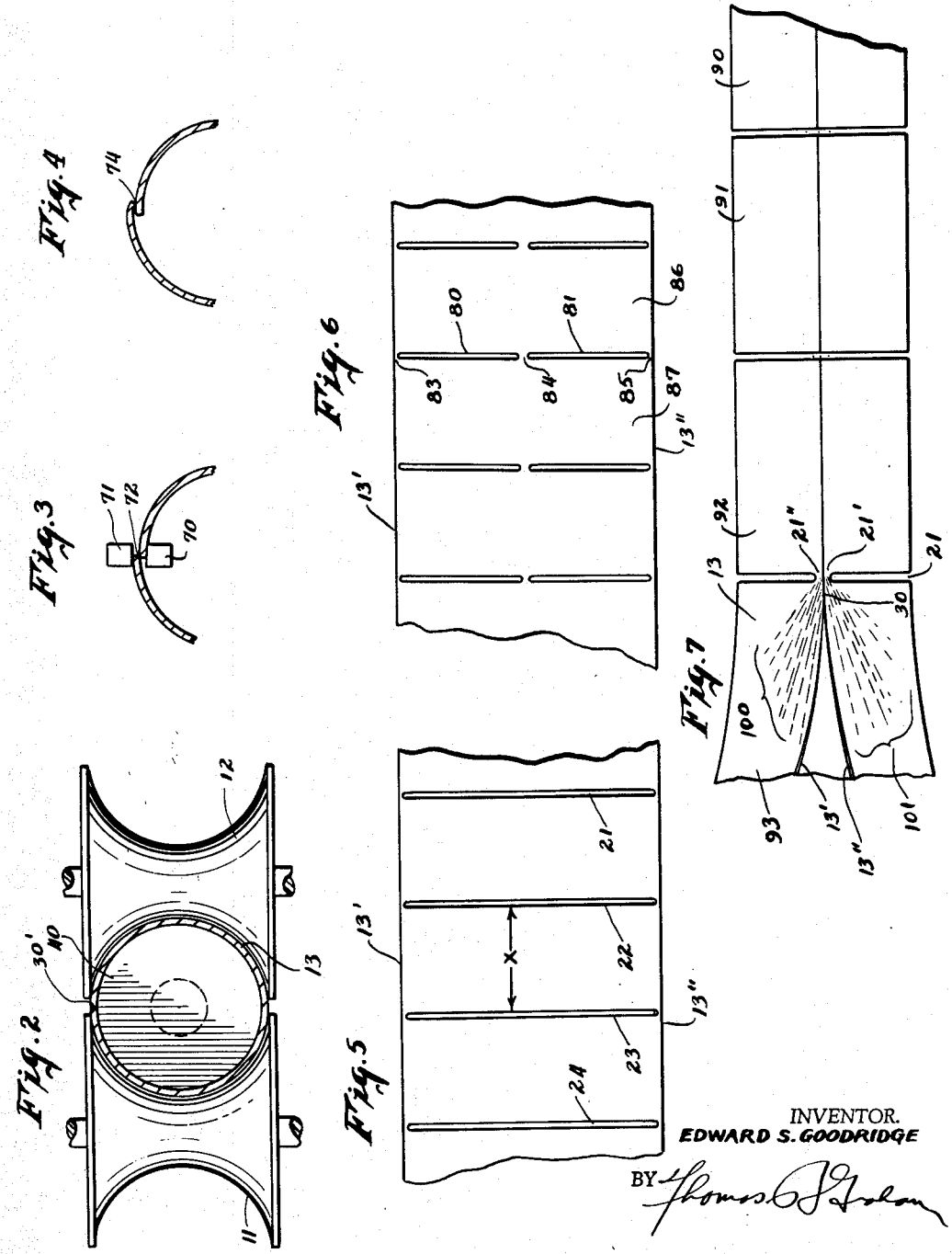
INVENTOR.
EDWARD S. GOODRIDGE
BY
ATTORNEY

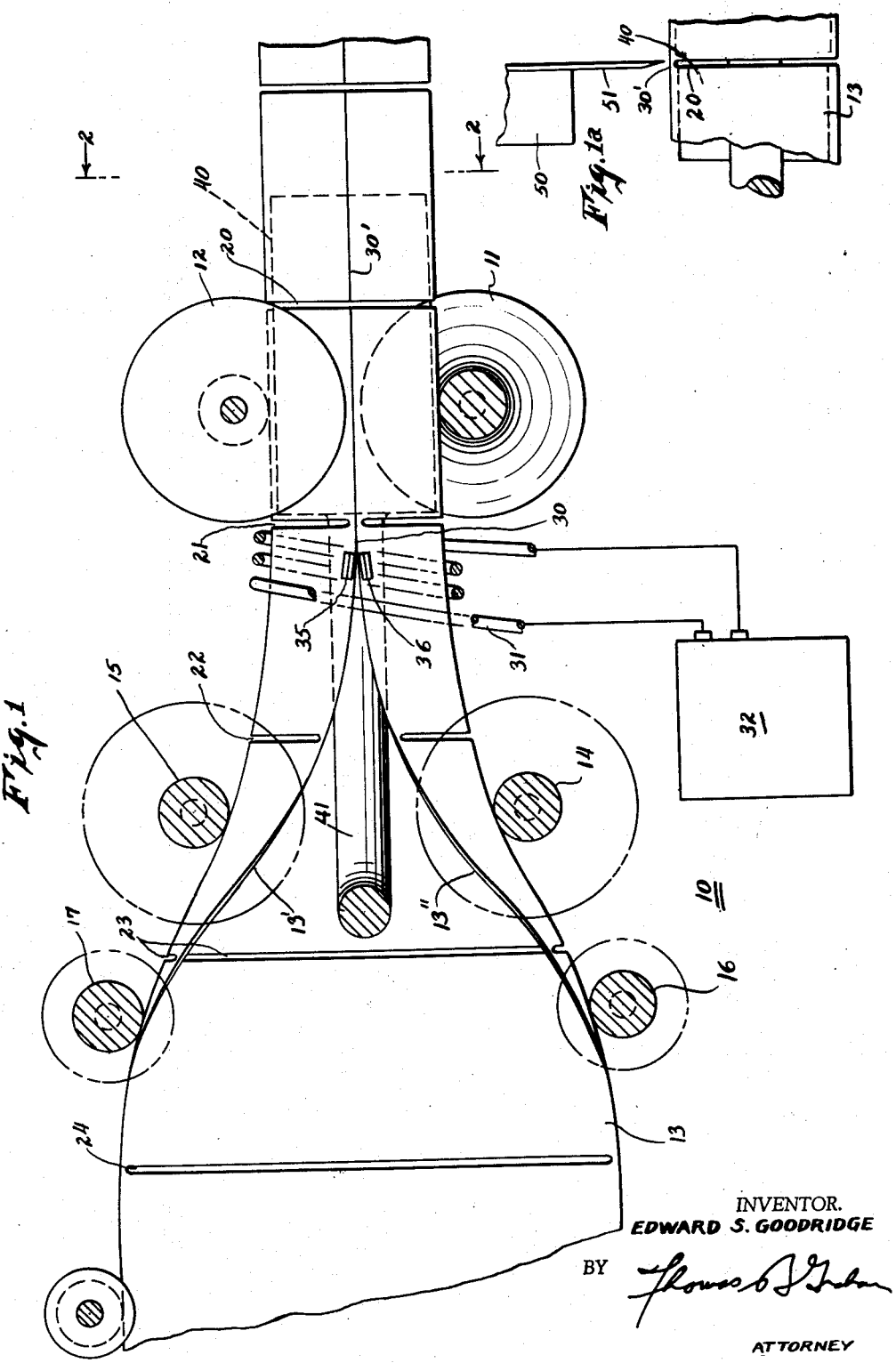

United States Patent Office 3,072,770
Patented Jan. 8, 1963

3,072,770
METHOD FOR THE FORMATION OF CYLINDERS
Edward S. Goodridge, Scarsdale, N.Y., assignor to Induction Heating Corporation, Brooklyn, N.Y., a corporation of New York
Filed Mar. 3, 1958, Ser. No. 718,813
1 Claim. (Cl. 219—8.5)

This invention relates to the method for the formation of cylindrical objects, especially thin walled objects useful as can bodies for the manufacture of cans, but in general suitable for the formation of any metal cylinders.

In the formation of "tin cans," as they are called in the vernacular, it is common practice to form the containers from sheet steel in a continuous operation in which the sheet is cut to size, rolled, crimped to form a longitudinal seam and then the can finished. Complications in forming the longitudinal seam in the can arise because conventional welding techniques appear to preclude a welding operation and, accordingly, the relatively complicated crimping must be practiced in order to make the joint. It would be highly advantageous if it were possible in the manufacture of cans or containers, if the sheet metal could be processed in a continuous operation in which a continuous longitudinal seam would be formed in the metal either by only a butt weld or a slight lap weld, thereby to permit the use of speedy machinery in the formation of the containers or cans. Also, arrangements for cutting off lengths of cylinder to correspond to individual cans are so complicated as to be impracticable.

It is, accordingly, a fundamental object of this invention to provide a method for the handling and processing of sheet steel in a manner such that it can be fabricated into cylindrical blanks for tin cans in a continuous welding operation.

It is another object of the invention to provide a method for fabricating cylinders of any length, cross section or any wall thickness.

Other objects and advantages of the invention will in part be obvious and in part appear hereinafter.

The invention, accordingly, is embodied in a method for the formation of cylinders of any length, such as tin can blanks in which the metal stock is passed in a continuous operation through a cutting stage in which transverse slots are made in the stock substantially across the width of the steel to define a sequence of sections representing ultimate cylinder height, having only a slight amount at each of the longitudinal edges or between sections of steel defined by said slots to carry the sections in a continuous operation, thereafter to pass the sheet, which still retains its basic flat shape through a forming stage including rollers, in which it is formed around a longitudinal axis into a continuous cylinder of the desired cross section, whereupon as the sheet passes to the point of actual contact of the longitudinal edges, the material goes through a heating zone, such as an induction heating unit in which the metal at the point of actual contact of the two edges is heated to welding temperature and, while at welding temperature, the material passes between pressure rolls and union of the edges is obtained. The completely formed tube thus obtained, with virtually complete circumferential slots, or serrations at intervals along its surface, is passed to a severing zone where the connecting elements between the cylinders are severed in timed sequence with movement of the stock as they appear at the cutting tool to form individual open ended cylinders for use in subsequent processing, for example, the formation of complete tin cans.

The severance of the separate cylindrical elements may be accomplished mechanically or electrically. In the mechanical severance cutters are synchronized with the longitudinal movement of the stock to sever the cylindrical elements. In the electrical severance the size of the residual portions of metal holding the cylindrical elements together is reduced to the point where the high current induced at the welding stage burns through the metal and completes the severance.

The invention, accordingly, consists of the method of operation which resides in the steps involved in the fabrication of the metal sheet for use in the process and the fabrication of the cylinder blanks themselves as well as in the steps and combination of steps in the manipulation of the apparatus, all of which is to be described in greater detail hereinafter.

In the drawings—
FIGURE 1 constitutes a diagrammatic plan view of the apparatus, showing the relation of the sheet stock to the forming section and welding sections of the process and machine; FIGURE 1a is a diagrammatic showing of a cutoff mechanism;
FIGURES 2, 3 and 4 illustrate several ways of forming the separate edges of the can blanks;
FIGURES 5 and 6 represent plan views of the sheet material used for the formation of the can blanks; and
FIGURE 7 is a diagrammatic representation of conditions at the welding zone at the point of completion of the weld and burn-off of the cylindrical element.

Referring now to FIGURE 1, 10 represents a machine base on which are mounted drive rollers 11 and 12 which serve to move the sheet of metal 13 in the direction indicated. Others such as forming rollers 14, 15 and 16, 17 also appear in the apparatus. These forming rollers are disposed so as to move the sheet in its longitudinal direction and simultaneously bend it around its longitudinal axis at a rate consistent with its rate of forward longitudinal movement. The metal 13 used as stock to form the cylinder is characterized by its having a sequence of transverse slits in it identified as 20, 21, 22, 23, 24 and 25, etc., spaced at predetermined intervals along the length of the sheet itself. Immediately prior to rollers 11 and 12 and virtually at the point 30 of actual contact of the two edges of sheet metal 13, I place the induction heating coil 31 which is connected to a high frequency generator 32. An alternative form of heating device is indicated by contact shoes 35 and 36 placed at the respective edges of the metal being heated, which would be driven by the same source of power. Within the cylinder of metal formed by rollers 11 and 12 and supported from machine base 10, I place mandrel 40, which is held in position by the arm 41, which in turn is mounted on the base 10 of the machine. The purpose of the mandrel is to provide a forming guide for the cylinder and also to provide a minimum amount of mechanical support for the formed cylinder as it passes from rollers 11 and 12 to the severing stage of the operation.

Beyond the point of formation of the cylinder, that is point 30, I provide severing means, which mechanically may consist of a cutter 50 on which there is cutting blade such as 51 synchronized to sever the cylinder defined by the slot 20. Cutter 50 is synchronized to have the cutting blade 51 sever the cylinder as it comes to the cutting stage at the end of the mandrel 40. In operation, because of the longitudinal movement of the cylinder, it is necessary to give cutter blade 51 a cycle of movement including a downward cutting stroke, longitudinal movement with the cylinder, while it disengages, and then an upward stroke to separate from the cylinder. A rotary cutter having its axis of rotation transverse to that of the cylinder effectively provides such motion.

The method of operation of the machine is substantially as follows:
In the manufacture of tin can blanks, for example, flat sheet metal element 13 as shown in plan view in FIGURE 5 having transverse perforations 20, 21, 22, 23, 24 and 25, spaced at predetermined intervals to define the desired height of the can by means of the space X between these transverse perforations, is fed through forming rollers, which may be virtually of any conventional form, and will take the material sheet and roll it around its axis to bring the two longitudinal external edges 13' and 13" into abutting relationship. It is to be understood also that the edges may be brought together in a lapped relationship if so desired. Cylinders of elliptical or rectangular cross-section may be rolled by properly shaping the rollers. At the point of contact of the edges 13' and 13" immediately prior to the contact pressure rollers 11 and 12, the effect of the induction heating coil 31 is felt and the induced currents in the traveling cylinder of metal concentrate in a circuit around the point 30 of the V formed by the contacting edges, heating the metal to welding temperature, so that as the metal passes through he forming rolls it is compressed sufficiently to induce an actual integral union or fusion of the metals.

Having joined the metal along the longitudinal edge in a hairline weld, the individual can sections remain held together only by metal represented by the longitudinal seam 30'.

Inasmuch as the transverse slots 20, 21, 22, 23, 24 and 25 may be virtually completely across the stock, or there need be no more than three or four small segments of metal holding the sections together, it is a matter of synchronization to have the cutter 50 and its blade 51 strike the remaining segment of metal as it comes to the end face of the mandrel 40 and sever the can bodies as they reach the cutting zone of the machine. In this manner I have found it possible to form metal sections of thin walls rapidly and without the complication involved in forming a mechanical crimped joint.

FIGURE 2 illustrates the butt joint, which is a preferred style, formed in the cylinder wall and inasmuch as the walls of the cylinder as a can blank are approximately 0.010 inch in thickness, the advantage of being able to form the welded joint in this fashion to make a neat tin can is evident. Following formation of the cylinder blanks, all cans may be processed in conventional fashion to have the bottoms and tops applied.

FIGURE 3 illustrates a minor variation of the cylinder blank in that it is a slight lapped joint. In this instance, for precise control, an integral mandrel 70 and an external mandrel 71 to compress the edges in the two directions indicated, may be desirable.

Similar considerations apply to the formation of a somewhat broader lap joint as illustrated in FIGURE 4. In both of these cases the can blank formed will have this minor irregularity and deviation from a true circular cross section, but the mechanical task of finishing off the butt joint is reduced in magnitude, because the thickness of the sheet steel used in the formation of cans in this manner is nominal.

Since point contact to concentrate current is desirable, the edges are lapped with one edge, 72 of FIGURE 3 and 74 of FIGURE 4, bent to a sharper radius to produce a contact as shown.

In FIGURE 5 there is illustrated the perforated form of sheet material for use in the process. There the sheet 13 may be of indefinite length and inasmuch as rates of speed of the order of 200 feet or more per minute are used, its length may be quite substantial. Edges 13' and 13" are those to be welded together and, accordingly, slots 21, 22, 23, 24, 25, etc., are cut in the sheet stock at a stage in the process before it enters the forming zone. Sheet stock pre-cut with slots may be used.

Slots 21, etc., are spaced a predetermined distance X from each other. In general, for highest speed operation, equidistant spacings are contemplated. However, all that is necessary is a careful predetermination so that cutoff may be synchronized with the slots.

The width of any slot, such as 21, may be as narrow as possible and in general is preferably a width of about the magnitude of the thickness of the sheet stock being fed into the process.

It is the transverse length of the slot which is utilized to speed the process of forming the cylindrical bodies and it is in connection with FIGURE 7 that this is set forth in detail.

FIGURE 6 illustrates a modified form of slot in sheet 13 in that it consists of a plurality of cuts 80, 81, in the stock to provide minor amounts of support 83, 84, 85, between the sections 86 and 87 of the sheet stock. Effectively, this form of slot "perforates" the sheet and to a certain extent simplifies the mechanical operation of rolling the stock around its axis to form the cylinders. Where a slot of this form is used, it is necessary to provide mechanical severing at the upper and lower edges of the cylinder, i.e., along the weld formed along edges 13' and 13" (supports 83 and 85) and along the diametrically opposite line where support 84 holds the separate cylinders together.

In FIGURE 7 I have illustrated the electrical conditions in the sheet stock which makes it feasible to burn the formed cylinders apart. There sheet stock 13 is slotted at 21–25 as indicated in FIGURE 1. All that holds the separate sections 90, 91, 92, 93 together is the residual connecting bits of metal like 21' and 21" at each end of each slot. Since currents having a frequency of 100 kilocycles per second to 3–4 million kilocycles and higher, per second are preferred for operation, current flow is restricted to a very thin skin at the surface of the metal. As indicated by arrows 100 and 101 the current density employed is concentrated at the point of the V 30 formed as the edges of the stock unite and at the intervals defined by the successive slots through the welding zone supporting metal like 21'—21", etc., is burned through to sever the can body.

For accomplishing the burnoff, it is apparent that the variables are amount of the metal, speed of weld and progress through the welding zone, and frequency of the current as well as current densities. The important variable is frequency of current for I have found that frequencies of the order of magnitude mentioned with current densities sufficient to cause welding of the metal, will also burn off the formed elements.

For forming tin cans, therefore, the width of slot is preferably only a few hundredths inch, 2–3, leaving only sufficient to hold the sections together and provide a track or contact at the edges for the contact shoes. The connecting element of metal in general will be about one-hundredth inch thick and about ¼–⅜ inch in width. Current of the frequency indicated at a density of 2,000 amperes causes clean severance of the cylinder elements; 1,000–3,000 amperes is a useful range.

Other refinements may be included in the process of making cylindrical objects, such as cans, include cleaning the seam, possibly lacquering the inside of the seam and deburring the circumferential rim of the open ended cylinder formed. In operation under conditions such as those outlined, it is found that the longitudinal weld in a cylindrical body is virtually a hairline weld and leaves a mark on the side of the cylinder only a few hundredths of an inch in width.

Since welding temperatures will produce an interruption of the coating on the sheet stock used for typical cans, it may be reasonable at a stage beyond the cutoff stage to include a step for lightly coating the inside of the seam with a lacquer. Cleaning of the seam may be readily accomplished by providing scraping or buffing means at the final cutoff step.

In the electrical burnoff of the cylindrical elements it is to be noted that minor irregularities in the edge of the circumference of the cylindrical body may be produced. These are minimized by minimizing the size of the connecting elements of sheet stock preserved between sections. To the extent they appear they do not affect the operations of the process and they may be ignored in subsequent operations for the application of tops and bottoms to the can. Where heavy walled sections are being formed into tubing such minor irregularities may be easily removed by machining operation.

Though the invention has been described with reference to only a limited number of examples, it is to be understood that variants thereof may be adopted without departing from its spirit or scope.

What is claimed is:

The method of continuously making open ended cylindrical metal container bodies of light gauge comprising providing sheet material of a width sufficient to form a body of predetermined periphery, wherein sheet metal stock of thin gauge is first slotted at regular intervals across its width, said slots being of an extent sufficient to leave at the edges of the sheet stock only sufficient metal barely to hold the slot-defined sections together, said metal remaining between sections forming points of contact between sections and being of substantially lesser mass than said sections, thereafter progressively forming said slotted sheet stock into a cylinder around a longitudinal axis, passing said cylinder through an induction heating zone to induce a temperature of welding level for said sheet stock, and immediately thereafter compressing said sheet stock edges together to form an integral joint, and causing individual elements of the cylinder defined by said slots to be separated from each other as the joining of the edges if completed, in accordance with the process in which the heating of edges of the metal fuses the connecting segments and the cylindrical bodies are electrically severed from each other thereby.

References Cited in the file of this patent

UNITED STATES PATENTS

| | | |
|---|---|---|
| 1,639,688 | Duncan | Aug. 23, 1927 |
| 2,177,545 | Wright | Oct. 24, 1939 |
| 2,444,463 | Nordquist | July 6, 1948 |
| 2,444,465 | Peters | July 6, 1948 |
| 2,666,831 | Seulen et al. | Jan. 19, 1954 |
| 2,687,464 | Crawford | Aug. 24, 1954 |
| 2,692,322 | Bennett | Oct. 19, 1954 |
| 2,769,886 | Crawford | Nov. 6, 1956 |
| 2,826,810 | Peterson | Mar. 18, 1958 |
| 2,827,544 | Cable et al. | Mar. 18, 1958 |

FOREIGN PATENTS

| | | |
|---|---|---|
| 122,671 | Australia | Nov. 14, 1946 |
| 393,315 | Great Britain | June 2, 1933 |